United States Patent
Kawamoto et al.

(10) Patent No.: US 11,916,454 B2
(45) Date of Patent: Feb. 27, 2024

(54) STATOR AND MOTOR

(71) Applicant: Nidec Corporation, Kyoto (JP)

(72) Inventors: Tatsuro Kawamoto, Kyoto (JP); Yuhei Yamaguchi, Kyoto (JP); Yoshiaki Yamashita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 99 days.

(21) Appl. No.: 17/592,538

(22) Filed: Feb. 4, 2022

(65) Prior Publication Data

US 2022/0271595 A1 Aug. 25, 2022

(30) Foreign Application Priority Data

Feb. 19, 2021 (JP) ................................ 2021-025649

(51) Int. Cl.
| | |
|---|---|
| *H02K 3/34* | (2006.01) |
| *H02K 3/50* | (2006.01) |
| *H02K 9/19* | (2006.01) |
| *H02K 1/16* | (2006.01) |

(52) U.S. Cl.
CPC ............... *H02K 3/345* (2013.01); *H02K 3/34* (2013.01); *H02K 3/50* (2013.01); *H02K 1/16* (2013.01); *H02K 9/19* (2013.01)

(58) Field of Classification Search
CPC .. H02K 9/19; H02K 9/00; H02K 9/02; H02K 9/04; H02K 9/06; H02K 9/08; H02K 9/10; H02K 9/12; H02K 9/14; H02K 9/16; H02K 9/18; H02K 3/34; H02K 3/345; H02K 7/14; H02K 3/50; H02K 3/52; H02K 3/522
USPC ................................................ 310/214, 215
See application file for complete search history.

(56) References Cited

U.S. PATENT DOCUMENTS

| | | | |
|---|---|---|---|
| 2018/0351428 A1* | 12/2018 | Okamoto | H02K 3/28 |
| 2019/0199174 A1* | 6/2019 | Nakamura | H02K 5/203 |
| 2020/0052539 A1* | 2/2020 | Hsu | H02K 15/14 |

FOREIGN PATENT DOCUMENTS

| | | | | |
|---|---|---|---|---|
| JP | 2017-184514 A | | 10/2017 | |
| KR | 20110112213 | * | 10/2011 | |
| WO | WO-2019082667 A1 | * | 5/2019 | H02K 3/34 |
| WO | WO-2021105156 A1 | * | 6/2021 | H02K 3/521 |

OTHER PUBLICATIONS

Schrenk et al, Stator in an Electric Machine with a Wiring Device and Electric Machine, Jun. 3, 2021, WO 2021105156 (English Machine Translation) (Year: 2021).*
Okita et al, Stator and Motor, May 2, 2019, WO 2019082667 (English Machine Translation) (Year: 2019).*
Sudhanshu et al, Stator Coil Coolant Flow Reduction Monitoring, Oct. 12, 2011, KR 20110112213 (English Machine Translation) (Year: 2011).*

* cited by examiner

*Primary Examiner* — Alexander A Singh
(74) *Attorney, Agent, or Firm* — Keating & Bennett, LLP (57) ABSTRACT

A stator includes a stator core that includes a core back portion having an annular shape and with a central axis as a center and tooth portions extending from the core back portion to an inside in a radial direction and arranged in a circumferential direction, insulators that are attached to the tooth portions from the inside in the radial direction, a coil that is wound around the insulator, and a cover that supports an inner surface of the insulator opposing the inside in the radial direction from the inside in the radial direction.

16 Claims, 8 Drawing Sheets

STATOR AND MOTOR

CROSS-REFERENCE TO RELATED APPLICATIONS

The present application claims priority under 35 U.S.C. § 119 to Japanese Patent Application No. 2021-025649, filed on Feb. 19, 2021, the entire contents of which are hereby incorporated herein by reference.

1. FIELD OF THE INVENTION

The present disclosure relates to a stator and a motor.

2. BACKGROUND

A stator manufactured by fitting an insulator around which a coil is wound into teeth is known in order to increase a space factor of windings. In a conventional stator, a structure is used which includes an adhesive in order to prevent a bobbin (insulator) from being released.

When the teeth and the insulator are bonded and fixed, there is a problem that it is difficult to obtain a stable fixing force due to variations in the injection amount of the adhesive, deterioration of the adhesive depending on a use environment, and the like.

SUMMARY

One example embodiment of a stator according to the present disclosure includes a stator core that includes a core back portion having an annular shape and with a central axis as a center and tooth portions extending from the core back portion to an inside in a radial direction and arranged in a circumferential direction, insulators that are attached to the tooth portions from the inside in the radial direction, a coil that is wound around the insulator, and a cover that supports an inner surface of the insulator opposing the inside in the radial direction from the inside in the radial direction.

One example embodiment of a stator according to the present disclosure includes a stator core that includes a core back portion having an annular shape and with a central axis as a center and tooth portions extending from the core back portion to an inside in a radial direction and arranged along a circumferential direction, insulators that are attached to the tooth portions from the inside in the radial direction, a coil that is wound around the insulator, and a cover that is fixed to the insulator. The insulator includes a boss protruding toward the cover. A fitting hole into which the boss is inserted is provided in the cover.

One example embodiment of a motor according to the present disclosure includes the above-described stator, a rotor that opposes the stator in a radial direction, and a housing that accommodates the stator and the rotor.

The above and other elements, features, steps, characteristics and advantages of the present disclosure will become more apparent from the following detailed description of the example embodiments with reference to the attached drawings.

DETAILED DESCRIPTION

Hereinafter, example embodiments of a motor 10 and a stator 30 will be described with reference to the drawings.

In the following description, an axial direction of a central axis J of the motor 10 is simply referred to an "axial direction", a radial direction with the central axis J as a center is simply referred to a "radial direction", and a circumferential direction with the central axis J as a center is simply referred to a "circumferential direction".

In the following description, an arrangement relationship between portions of the motor 10 and the stator 30 will be described with one side in the axial described as an upper side and the other side in the axial direction as a lower side. However, poses of the motor 10 and the stator 30 in actual use are not limited to a vertical direction described in the present specification.

Figure 1:
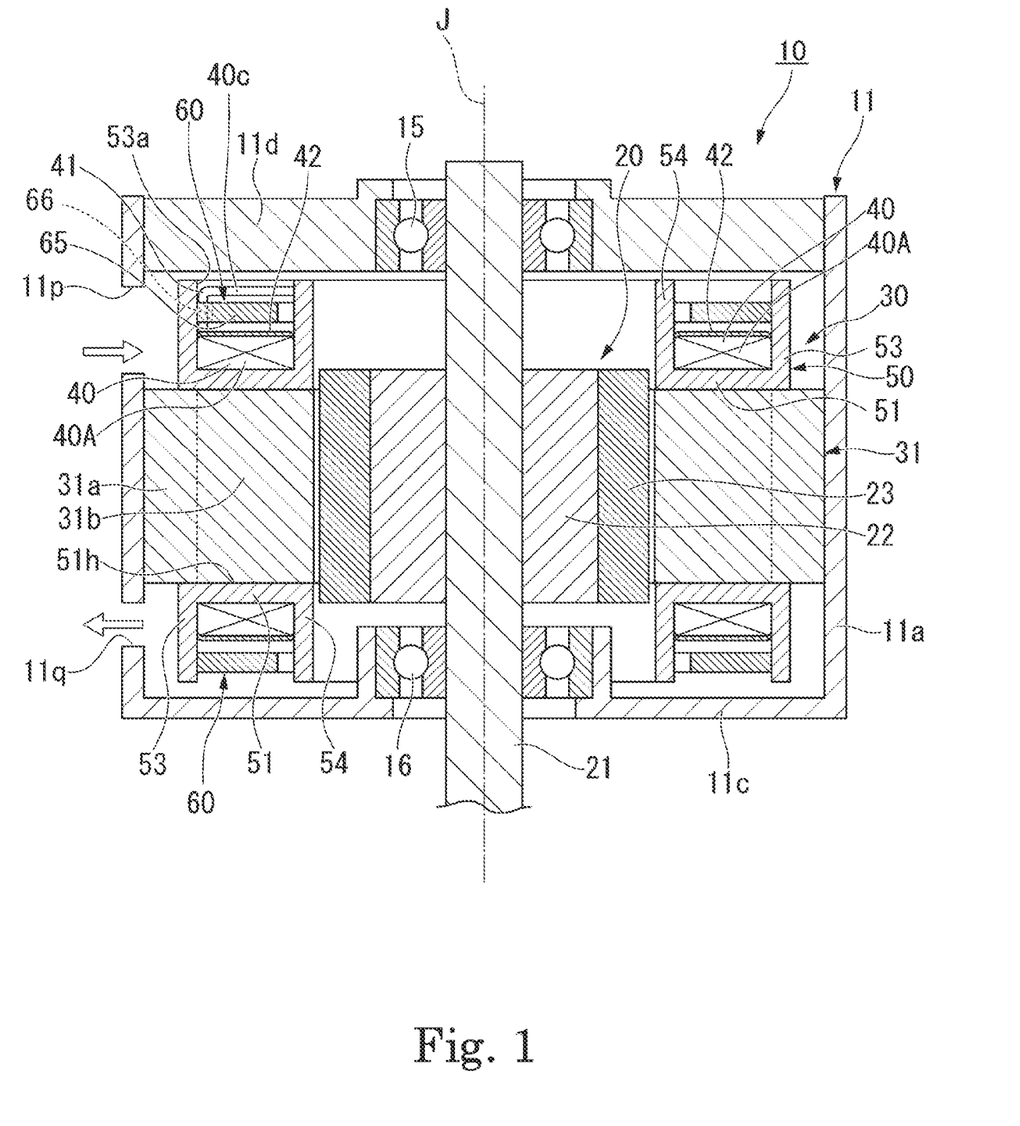
FIG. 1 is a schematic sectional view of a motor according to an example embodiment of the present disclosure.
Figure 2:
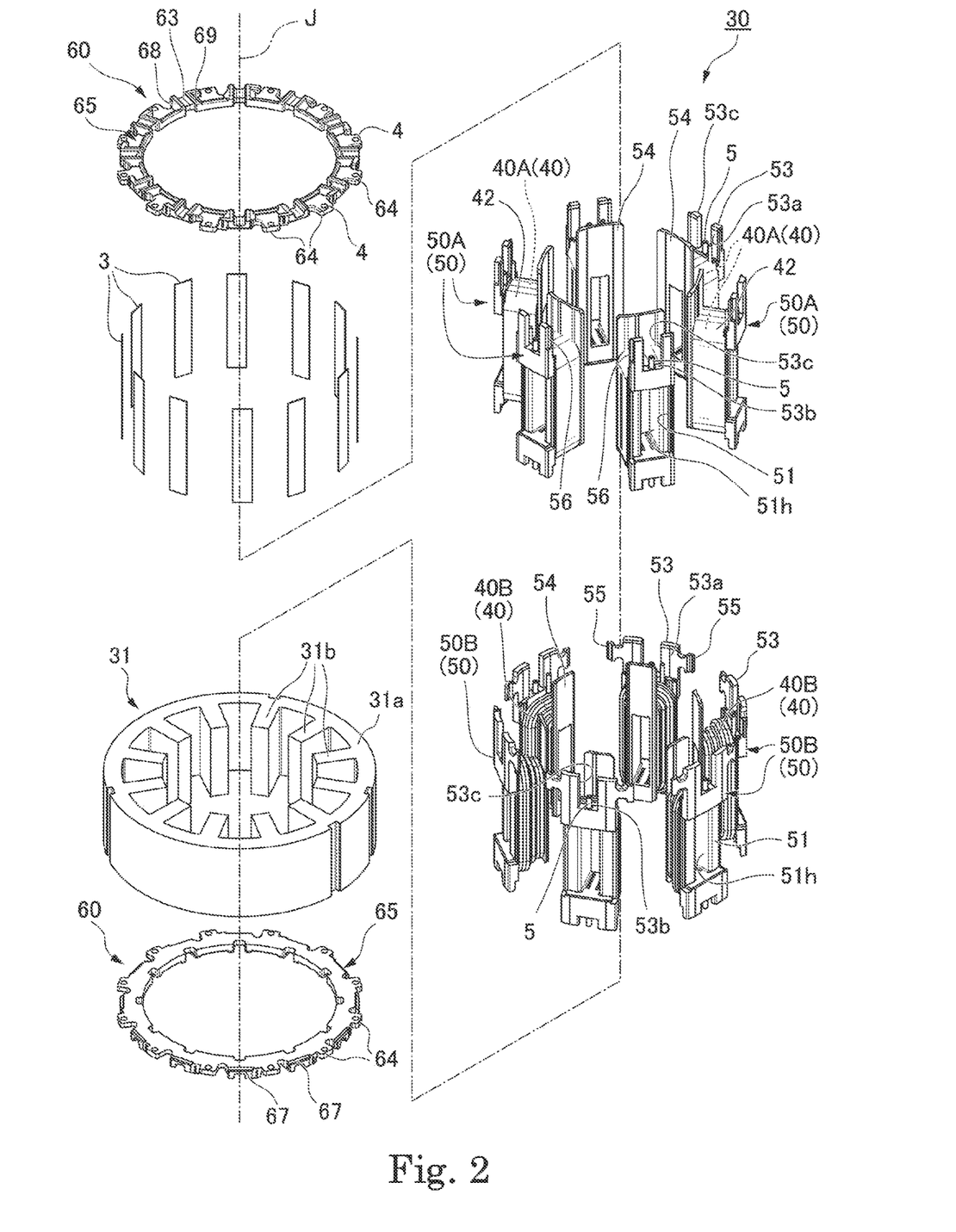
FIG. 2 is an exploded perspective view of a stator according to an example embodiment of the present disclosure.
Figure 3:
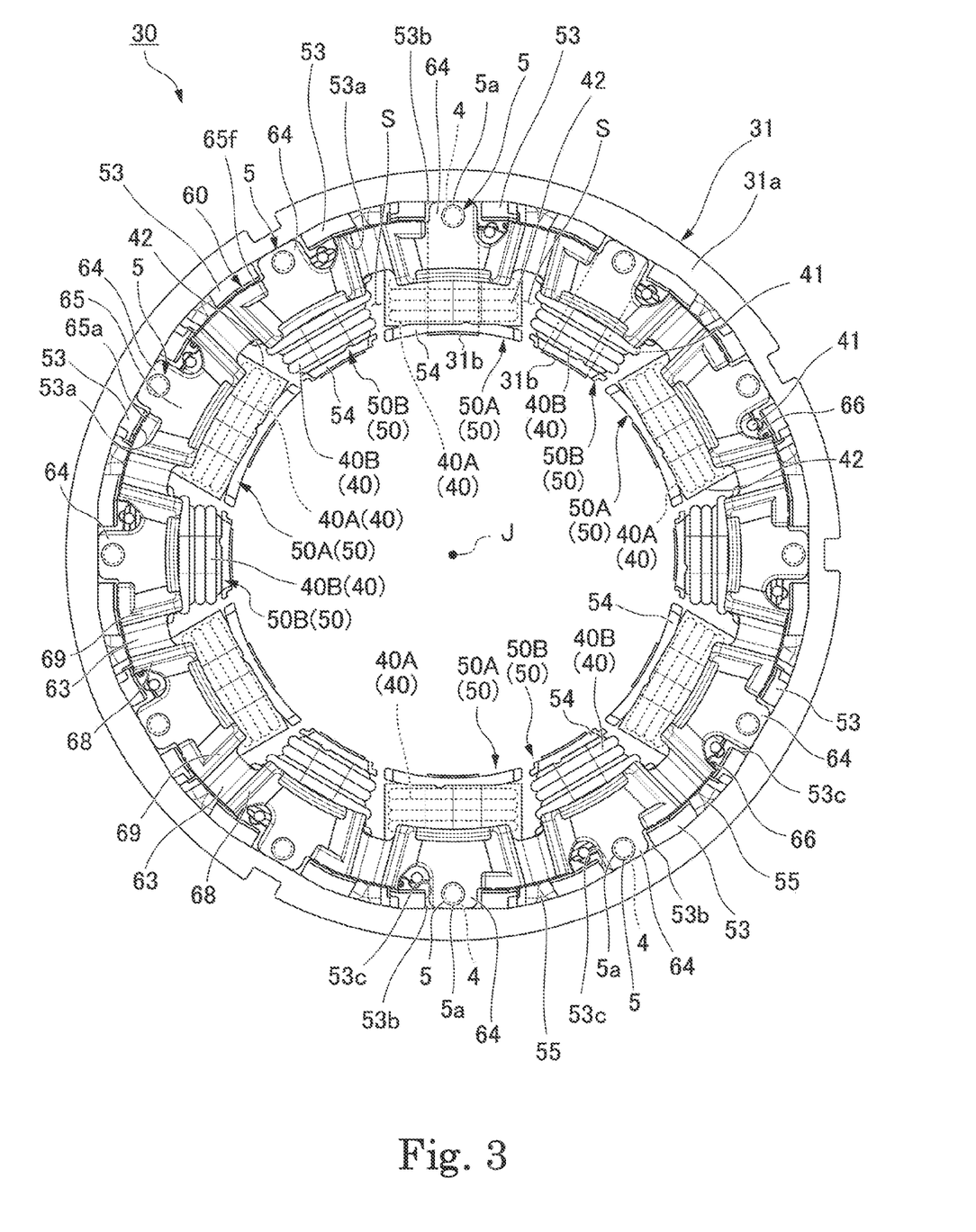
FIG. 3 is a plan view of a stator according to an example embodiment of the present disclosure.

FIG. 1 is a schematic sectional view of the motor 10 according to the present example embodiment. FIG. 2 is an exploded perspective view of the stator 30 according to the present example embodiment. FIG. 3 is a plan view of the stator 30.

As illustrated in FIG. 1, the motor 10 according to the present example embodiment includes a rotor 20 with the central axis J as a center, the stator 30 disposed on an outside of the rotor 20 in the radial direction, a housing 11, and a plurality of bearings 15 and 16. The motor 10 according to the present example embodiment is an inner-rotor motor. The rotor 20 rotates about the central axis J.

The housing 11 accommodates therein the rotor 20 and the stator 30. The housing 11 includes a tubular portion 11a, a bottom wall portion 11c, and a bearing holding wall portion 11d. The tubular portion 11a has a cylindrical shape extending along the central axis J. The bearing holding wall portion 11d covers an opening of the tubular portion 11a on one side in the axial direction. The bearing holding wall portion 11d is fixed to an inner peripheral surface of the tubular portion 11a. The bearing holding wall portion 11d holds the bearing 15. The bottom wall portion 11c covers an opening of the tubular portion 11a on the other side in the axial direction. The bottom wall portion 11c holds the bearing 16.

A refrigerant flows inside the housing 11. A refrigerant inflow port 11p and a refrigerant discharge port 11q are provided in the tubular portion 11a. The refrigerant inflow port 11p and the refrigerant discharge port 11q are arranged side by side in the axial direction. The refrigerant inflow port 11p is positioned on one side in the axial direction with respect to the stator 30, and the refrigerant discharge port 11q is positioned on the other side in the axial direction with respect to the stator 30. In the housing 11, the refrigerant passes through a slot S of the stator 30 and flows from one side to the other side in the axial direction of the stator 30.

The rotor 20 faces the stator 30 in the radial direction. The rotor 20 according to the present example embodiment is disposed on an inside of the stator 30 in the radial direction. The rotor 20 includes a shaft 21, a rotor core 22, and a magnet 23. The shaft 21 has a columnar shape extending in the axial direction. The shaft 21 may have a cylindrical shape extending in the axial direction. The shaft 21 is supported by the plurality of bearings 15 and 16 so as to be rotatable about the central axis J. The plurality of bearings 15 and 16 are arranged with gaps therebetween in the axial direction, and are supported by the housing 11. That is, the shaft 21 is supported by the housing 11 via the plurality of bearings 15 and 16.

The rotor core 22 has a tubular shape extending in the axial direction. The rotor core 22 has an outer diameter larger than the shaft 21. The rotor core 22 has a length smaller than the shaft 21 in the axial direction. An inner peripheral surface of the rotor core 22 is fixed to an outer peripheral surface of the shaft 21. The rotor core 22 is fixed to the shaft 21 by press fitting, bonding, or the like. The rotor core 22 is positioned between the pair of bearings 15 and 16 in the axial direction. The magnet 23 is fixed to an outer peripheral portion of the rotor core 22.

The stator 30 faces the rotor 20 with a gap therebetween in the radial direction. The stator 30 surrounds the rotor 20 from the outside in the radial direction over the entire circumference in the circumferential direction. The stator 30 includes a stator core 31, a plurality of insulators 50, two covers 60, a plurality of coils 40, a plurality of covering portions 42, and a plurality of insulating sheets 3.

The stator core 31 surrounds the rotor 20 from the outside in the radial direction. The stator core 31 is formed by, for example, a plurality of electromagnetic steel plates stacked in the axial direction. The stator core 31 is fixed to an inner peripheral surface of the housing 11. The stator core 31 and the housing 11 are fixed by, for example, shrink fitting, press fitting, or the like.

The stator core 31 includes a core back portion 31a and a plurality of tooth portions 31b. The core back portion 31a is in an annular shape with the central axis J as a center. An outer peripheral surface of the core back portion 31a facing the outside in the radial direction is fixed to the inner peripheral surface of the tubular portion 11a.

The plurality of tooth portions 31b extend to the inside in the radial direction from the core back portion 31a. The plurality of tooth portions 31b are arranged along the circumferential direction. The plurality of tooth portions 31b are arranged with gaps therebetween in the circumferential direction. The slot S (see FIG. 3) is provided between the tooth portions 31b adjacent to each other in the circumferential direction. An inner surface of each tooth portion 31b in the radial direction faces an outer surface of the rotor 20 in the radial direction with a gap therebetween.

The plurality of insulators 50 are attached to the plurality of tooth portions 31b from the inside in the radial direction, respectively. The insulator 50 is an insulating member that insulates the coil 40 from the tooth portion 31b. For example, the insulator 50 is made of resin.

The insulator 50 includes an insulator body portion 51, an outer wall portion (wall portion) 53, and an inner wall portion 54.

The insulator body portion 51 has a square tubular shape extending in the radial direction. A through-hole 51h penetrating in the radial direction is provided in the insulator body portion 51. The tooth portion 31b passes through the through-hole 51h. Thus, the insulator body portion 51 surrounds the tooth portion 31b.

The inner wall portion 54 expands in a direction orthogonal to the radial direction from an inner end portion of the insulator body portion 51 in the radial direction. Similarly, the outer wall portion 53 expands in the axial direction from an outer end portion of the insulator body portion 51 in the radial direction.

As illustrated in FIG. 3, the inner wall portion 54 and the outer wall portion 53 have a plate shape in which plate surfaces are curved and extend along the circumferential direction. That is, the inner wall portion 54 and the outer wall portion 53 extend along the circumferential direction. The inner wall portions 54 and the outer wall portions 53 of the plurality of insulators 50 are arranged in an annular shape along the circumferential direction.

As illustrated in FIG. 2, a cutout portion 53c extending downward from an upper end edge is provided in the outer wall portion 53. The cutout portion 53c is positioned at a center of the outer wall portion 53 in the circumferential direction. The cutout portion 53c has a bottom surface 53b facing upward. A boss 5 for fixing the covers 60 is provided in the bottom surface 53b. That is, the insulator 50 has the boss 5. The boss 5 protrudes toward the cover 60 positioned on an upper side of the insulator 50. The boss 5 extends upward from the bottom surface 53b. Although the boss 5 of an upper insulator 50A of two insulators 50A and 50B to be described later has been described here, the boss of the lower insulator 50B has the same configuration.

12 insulators 50 are provided in the stator 30 according to the present example embodiment. The 12 insulators 50 are classified into six first insulators 50A and six second insulators 50B. The first insulators 50A and the second insulators 50B are alternately arranged in the circumferential direction. Thus, the first insulator 50A and the second insulator 50B are adjacent to each other in the circumferential direction.

The first insulator 50A and the second insulator 50B are different mainly in the shape of the outer wall portion 53. Here, the outer wall portion 53 of the first insulator 50A is referred to as a first outer wall portion 53A, and the outer wall portion 53 of the second insulator 50B is referred to as a second outer wall portion 53B.

The second outer wall portion 53B has a pair of arm portions 55 extending to both sides in the circumferential direction. On the other hand, arm accommodation recess portions 56 recessed to the inside in the radial direction are provided in both ends of an outer peripheral surface of the first outer wall portion 53A in the circumferential direction. A distal end of the arm portion 55 of the second outer wall portion 53B is disposed in the arm accommodation recess portion 56 of the first outer wall portion 53A. Accordingly, inner peripheral surfaces of the arm portions 55 are in contact with outer peripheral surfaces of the insulators (first insulators 50A) adjacent to each other in the circumferential direction which face the outside in the radial direction. Since the arm portion 55 of the second insulator 50B is disposed on the outside of the first insulator 50A in the radial direction, the movement of the second insulator to the inside in the radial direction is restricted by the first insulator 50A.

As illustrated in FIG. 1, the coil 40 includes coil wires 41 wound in multiple layers. Each of the plurality of coils 40 is wound around the insulator 50. The coil 40 is positioned between the inner wall portion 54 and the outer wall portion 53 in the radial direction. That is, the inner wall portion 54 and the outer wall portion 53 guide the coil 40 from both sides in the radial direction. The inner wall portion 54 and the outer wall portion 53 suppress the separation of the coil 40 from the insulator 50 in the radial direction.

Some coils 40 among the plurality of coils 40 are connected to each other via jump wires 40c. The jump wires 40c are positioned on an upper side of the coils 40. The jump wires 40c extend along the circumferential direction between the coils 40. That is, the plurality of coils 40 are connected to each other by the jump wires 40c extending along the circumferential direction on the upper side of the coils 40. The jump wire 40c is insulated from the other jump wires 40c by being covered with, for example, a heat shrinkable tube.

As illustrated in FIG. 3, the coils 40 according to the present example embodiment are classified into first coils 40A wound around the first insulators 50A and second coils 40B wound around the second insulators 50B. The first coils 40A and the second coils 40B are alternately arranged in the circumferential direction. Thus, the first coil 40A and the second coil 40B are adjacent to each other in the slot S. Both the first coil 40A and the second coil 40B are formed by winding the coil wires 41 in multiple layers. The first coil 40A and the second coil 40B are different from each other in the winding manner of the coil wires 41.

The first coil 40A is formed in a rectangular shape as viewed from the axial direction. In the first coil 40A, the coil wire 41 is wound with a uniform number of layers from a distal end side toward a proximal end side of the tooth portion 31b. That is, in the first coil 40A, the number of windings of the coil wire 41 is uniform along the radial direction.

The second coil 40B is formed in a trapezoidal shape as viewed from the axial direction. In the second coil 40B, the coil wire 41 is wound such that the number of layers increases from the distal end side toward the proximal end side of the tooth portion 31b. That is, in the second coil 40B, the number of windings of the coil wire 41 increases toward the outside in the radial direction.

Here, the "number of windings of the coil wire" for the first coil 40A and the second coil 40B is the local number of windings (that is, the number of layers) of the coil 40 in a specific position in the radial direction, and does not mean the total number of windings of the entire one coil (the entire region from the inside in the radial direction to the outside in the radial direction).

The total number of windings of the coil wire 41 of the first coil 40A and the total number of windings of the coil wire 41 of the second coil 40B are equal to each other. The coil wires 41 constituting the first coil 40A and the second coil 40B are the same type of coil wires. Thus, a magnetic flux density of a magnetic field formed by the first coil 40A is substantially equal to a magnetic flux density of a magnetic field formed by the second coil 40B.

The covering portion 42 covers an outer peripheral surface of the first coil 40A. Thus, both end surfaces of the first coil 40A in the circumferential direction and both end surfaces thereof in the axial direction are covered with the covering portions 42. On the other hand, the covering portion is not provided on an outer peripheral surface of the second coil 40B. Thus, both end surfaces of the second coil 40B in the circumferential direction are exposed to the slot S side.

The covering portion 42 is made of an insulating material. The covering portion 42 according to the present example embodiment is, for example, an insulating heat shrinkable tube. The covering portion 42 has a tubular shape extending in the radial direction. The covering portion 42 comes into close contact with the outer peripheral surface of the first coil 40A without any gap by covering and heating the first coil 40A before contraction. With the contraction, the first coil 40A is deformed in a wave shape along the outer peripheral surface of the first coil 40A to cover the outer peripheral surface of the first coil 40A.

In the slot S, a peripheral end surface of the first coil 40A is covered with the covering portion 42, and a peripheral end surface of the second coil 40B is exposed to the slot S side. Thus, in the slot S, the insulating covering portion 42 is disposed between the peripheral end surface of the first coil 40A and the peripheral end surface of the second coil 40B. The covering portion 42 insulates the first coil 40A and the second coil 40B from each other.

In the present specification, the peripheral end surface means an end surface facing the circumferential direction.

According to the present example embodiment, the insulation of the two coils 40 can be secured by providing the covering portion 42 only on the peripheral end surface of one coil 40 of the two coils 40 facing each other in the circumferential direction in the slot S. According to the present example embodiment, the number of use of the covering portion 42 can be reduced, the component cost can be reduced, a step of molding the covering portion 42 can be reduced, and the manufacturing cost of the stator 30 can be reduced.

The coil 40 is attached to the tooth portion 31b together with the insulator 50 in a state of being wound around the insulator 50. In the present example embodiment, the first coil 40A and the first insulator 50A are attached to the tooth portions 31b after all the second coils 40B and the second insulators 50B are attached to the tooth portions 31b.

As illustrated in FIG. 2, the plurality of insulating sheets 3 are arranged along the circumferential direction. The insulating sheets 3 are arranged along a surface (inner peripheral surface) of the core back portion 31a facing the inside in the radial direction with a thickness direction as the radial direction. The insulating sheet 3 has rectangular shape with the axial direction as a longitudinal direction.

The insulating sheet 3 is disposed between the tooth portions 31b adjacent to each other in the circumferential direction. Parts of the end portions the insulating sheet 3 on both sides in the circumferential direction are covered with the outer wall portions 53 of the insulators 50 (the first insulator 50A and the second insulator 50B) adjacent to each other in the circumferential direction from the outside in the radial direction. Accordingly, the insulating sheet 3 is sandwiched between the inner peripheral surface of the core back portion 31a and the outer wall portion 53, and the movement in the radial direction is restricted. The insulating sheet 3 is inserted from above between the inner peripheral surface of the core back portion 31a and the outer wall portion 53.

The insulating sheet 3 is disposed in a gap between the outer wall portions 53 of the insulators 50 adjacent to each other in the circumferential direction. Accordingly, a creepage distance between the coil 40 wound around the insulator 50 and the core back portion 31a can be increased, and the insulation between the coil 40 and the core back portion 31a can be secured.

Next, the covers 60 will be described in detail. Although the upper cover 60 of the two covers 60 will be described here, the lower cover 60 has the same configuration.

The cover 60 includes a cover body portion 65 and a plurality of fixing pieces 64 fixed to the insulators 50. The cover body portion 65 has a disk shape along a plane with the central axis J as a center and orthogonal to the central axis J.

As illustrated in FIG. 1, the cover body portion 65 is positioned on the upper side of the coil 40 (one side in the axial direction) and on a lower side of the jump wire 40c (the other side in the axial direction). The cover body portion 65 defines a region where the coil 40 is disposed and a region where the jump wire 40c is disposed. The cover body portion 65 secures the insulation between the coil 40 and the jump wire 40c.

In FIG. 3, the jump wire 40c disposed on an upper side of the cover body portion 65 is not illustrated.

As illustrated in FIG. 3, the cover body portion 65 passes through between the outer wall portion 53 and the inner wall portion 54 and extends in the circumferential direction. Here, a surface of the outer wall portion 53 facing the inside in the radial direction is referred to as an inner surface 53a. That is, the insulator 50 has the inner surface 53a facing the inside in the radial direction. The cover body portion 65 is in contact with the inner surface 53a from the inside in the radial direction. Accordingly, the cover 60 supports the inner surface 53a from the inside in the radial direction, and suppresses the insulator 50 from moving to the inside in the radial direction.

When a current is supplied to the stator 30, a magnetic pole is generated in the coil 40, and a magnetic force directed in the radial direction is applied to the coil 40 and the insulator 50 around which the coil 40 is wound. The insulator 50 according to the present example embodiment is attached to the tooth portion 31b from the inside in the radial direction. Thus, when a force directed to the inside in the radial direction is applied to the coil 40 and the insulator 50, there is a concern that the insulator 50 is escaped from the tooth portion 31b. According to the present example embodiment, the cover 60 restricts the movement of the insulator 50 to the inside in the radial direction, and thus, the insulator 50 can be fixed to the stator core 31. Accordingly, the interference between the insulator 50 and the rotor 20 can be suppressed, and the reliability of the motor 10 can be enhanced.

In the present example embodiment, the insulator 50 in which the inner surface 53a facing the inside in the radial direction is provided on the outer wall portion 53 has been described. However, the inner surface 53a in contact with the cover 60 may be a surface that is provided at another portion of the insulator 50 and faces the inside in the radial direction.

According to the present example embodiment, the outer wall portions 53 of the plurality of insulators 50 are arranged in the annular shape along the circumferential direction, and the cover 60 is fitted inside the plurality of outer wall portions 53. Thus, the insulators 50 positioned on opposite sides with the central axis J interposed therebetween are arranged with the cover 60 interposed therebetween, and suppress the movement in the radial direction with the cover interposed therebetween. That is, according to the present example embodiment, the cover 60 is less likely to move in any direction in the plane orthogonal to the central axis J, and the stability of suppressing the movement of the insulators 50 can be enhanced.

In the present example embodiment, the cover 60 is in contact with the inner surfaces 53a of all the insulators 50. However, the cover 60 according to the present example embodiment may be in contact with only the inner surfaces 53a of the first insulator 50A. The inner peripheral surface of the arm portion 55 of the second insulator 50B according to the present example embodiment is in contact with the outer peripheral surface of the first insulator 50A adjacent in the circumferential direction, which faces to the outside in the radial direction. That is, a part (arm portion 55) of the second insulator 50B is disposed on the outside in the radial direction from the outer peripheral surface of the first insulator 50A and is in contact with the outer peripheral surface from the outside in the radial direction. Thus, the movement of the second insulator 50B toward the inside in the radial direction is restricted by the first insulator 50A. Even though the cover 60 supports only the first insulator 50A from the inside in the radial direction, the movement of the second insulator 50B in the radial direction can be restricted via the first insulator 50A.

As illustrated in FIG. 2, the two covers 60 are provided in the stator 30 according to the present example embodiment. The two covers 60 according to the present example embodiment have the same shape. The two covers 60 sandwich the plurality of insulators 50 from the vertical direction. One cover 60 supports the inner surface 53a of the outer wall portion 53 on an upper side of the plurality of insulators 50 (one side in the axial direction). The other cover 60 supports the inner surface 53a of the outer wall portion 53 on a lower side of the plurality of insulators 50 (the other side in the axial direction). Since the two covers 60 support the insulators 50 on both sides in the vertical direction, it is possible to stably suppress the movement of the insulators 50 to the inside in the radial direction.

Figure 4:
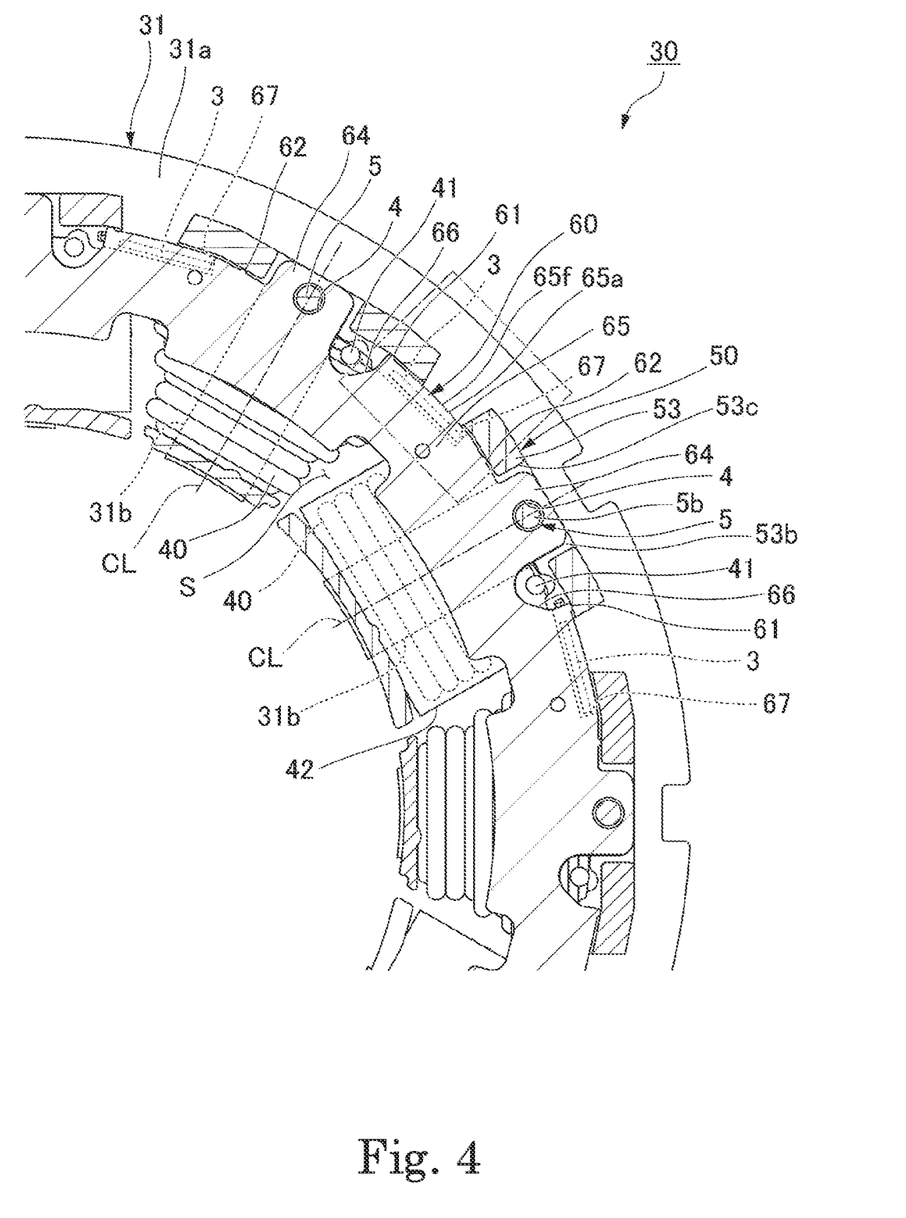
FIG. 4 is a partial cross-sectional view of a stator according to an example embodiment of the present disclosure.

FIG. 4 is a partial cross-sectional view of the stator 30 orthogonal to the central axis J.

An opposing surface 65f facing the outside in the radial direction and facing the inner surface 53a of the outer wall portion 53 is provided at an outer edge 65a of the cover body portion 65 positioned on the outside in the radial direction. That is, the cover 60 has the opposing surface 65f. A plurality of protrusion ribs (protrusions) 61 and 62 are provided in the opposing surface 65f.

The protrusion ribs 61 and 62 protrude to the outside in the radial direction. The protrusion ribs 61 and 62 extend along the axial direction. The plurality of protrusion ribs 61 and 62 are arranged along the circumferential direction. Distal ends of the protrusion ribs 61 and 62 in a protrusion direction are in contact with the inner surfaces 53a of the outer wall portions 53. That is, the protrusion ribs 61 and 62 are in contact with the inner surfaces 53a at the distal ends.

According to the present example embodiment, the covers 60 are in contact with the insulator 50 at the distal ends of the protrusion ribs 61 and 62. Thus, a press-fitting margin of the covers 60 to the inside of the plurality of insulators 50 can be easily adjusted by managing dimensions of protrusion heights of the protrusion ribs 61 and 62. It is possible to increase the reliability of the contact between the covers 60 and the insulators 50. Accordingly, all the insulators 50 can be brought into contact with the covers 60 without rattling.

The plurality of protrusion ribs 61 and 62 are classified into first protrusion ribs 61 and second protrusion ribs 62 alternately arranged along the circumferential direction. The first protrusion rib 61 and the second protrusion rib 62 are in contact with the inner surface 53a of one insulator 50. The first protrusion rib 61 and the second protrusion rib are positioned on one side in the circumferential direction and the other side in the circumferential direction with respect to a center line CL of one tooth portion 31b. That is, the inner surface 53a of one insulator 50 is in contact with the first protrusion rib 61 positioned on one side in the circumferential direction with respect to the center line CL of the tooth portion 31b and the second protrusion rib 62 positioned on the other side as viewed from the axial direction. Thus, the covers 60 can stably suppress the movement of the insulator 50 to the inside in the radial direction along the center line CL of the tooth portion 31b.

A recess portion 66 recessed to the inside in the radial direction is provided at the outer edge 65a of the cover body portion 65. The recess portion 66 is disposed adjacent to the fixing piece 64 of the insulator 50 in the circumferential direction. The coil wire 41 extending from the coil 40 passes through the recess portion 66. The coil wire 41 extending from the coil 40 may be the jump wire 40c connecting the coils 40, or may be a connection wire connected to an external power supply that supplies power to the stator 30.

According to the present example embodiment, since the coil wire 41 drawn from the coil 40 passes through the recess portion 66, the coil wire 41 can pass through between the cover body portion 65 and the outer wall portion 53. Thus, as compared with a case where the coil wire 41 is routed by detouring the coil wire to the outside of the outer wall portion 53, it is possible to shorten the coil wire 41, and it is possible to suppress an increase in size of the stator 30 in the radial direction.

Accommodation recess portions 67 recessed upward are provided in an outer edge of a lower surface of the cover body portion 65. The number of accommodation recess portions 67 according to the present example embodiment is the same as the number of tooth portions 31b. The accommodation recess portion 67 is positioned between the tooth portions 31b adjacent to each other in the circumferential direction. An upper end portion of the insulating sheet 3 is accommodated in the accommodation recess portion 67. As will be described later, the cover attached to the insulator 50 from below also has the accommodation recess portions 67 that accommodate the insulating sheets 3. Thus, a lower end portion of the insulating sheet 3 is accommodated in the accommodation recess portion 67 provided in the cover attached from below. Accordingly, the accommodation recess portion 67 suppresses a shift in a position of the insulating sheet 3. When the position of the insulating sheet 3 is shifted, the creepage distance between the inner peripheral surface of the core back portion 31a and the coil 40 is shortened, and thus, there is a concern that insulation performance deteriorates. According to the present example embodiment, since the accommodation recess portion 67 accommodates the insulating sheet 3, the insulation of the stator 30 can be enhanced.

Figure 5:
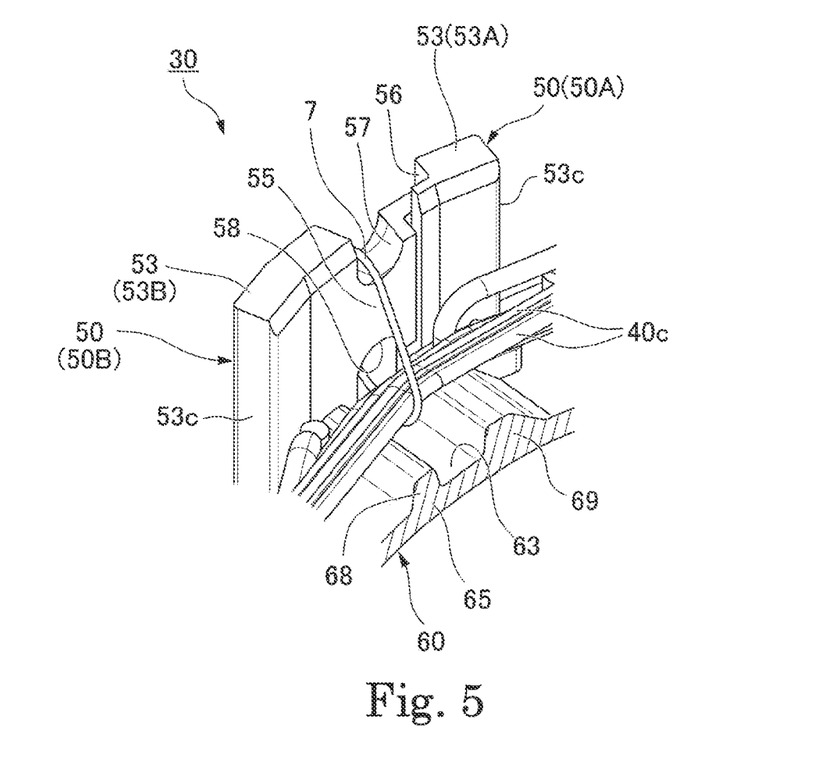
FIG. 5 is a perspective view of a portion of a stator according to an example embodiment of the present disclosure.

FIG. 5 is a perspective view of the stator 30 in the vicinity of a boundary between the two outer wall portions 53. FIG. 5 illustrates the stator 30 in a region in the vicinity of a boundary between the first insulator 50A and the second insulator 50B, which is surrounded by a dashed dotted line in FIG. 4. In FIG. 5, a part of the cover 60 is displayed in a cross section.

As described above, one of the pair of outer wall portions 53 of the insulators 50 (the first insulator 50A and the second insulator 50B) adjacent to each other in the circumferential direction is the first outer wall portion 53A, and the other outer wall portion is the second outer wall portion 53B. The arm portion 55 of the second outer wall portion 53B extends toward the first outer wall portion 53A adjacent in the circumferential direction. The arm portion 55 is disposed on an upper side of the cover 60. An upper cutout portion 57 opened upward is provided in an upper end portion of the arm portion 55. Similarly, a lower cutout portion 58 opened downward is provided in a lower end portion of the arm portion 55.

A binding band 7 is wound around the upper cutout portion 57 and the lower cutout portion 58. The binding band 7 binds the plurality of jump wires. Accordingly, the plurality of jump wires 40c can be fixed to the insulators 50.

A plurality of ribs 68 and 69 arranged along the circumferential direction are provided on an upper surface (surface facing one side in the axial direction) of the cover body portion 65. The ribs 68 and 69 protrude upward (one side in the axial direction). Protrusion heights of the plurality of ribs 68 and 69 coincide with each other. The ribs 68 and 69 extend along the radial direction. The ribs 68 and 69 are provided over the entire width of the cover body portion 65 in the radial direction. The ribs 68 and 69 increase the rigidity of the cover body portion 65 in the radial direction, and suppress the deformation of the cover 60 when a force is applied from the insulator 50 to the cover 60.

The jump wire 40c before being bound by the binding band 7 is in contact with upper end surfaces of the ribs 68 and 69. Accordingly, a gap corresponding to the protrusion heights of the ribs 68 and 69 is provided between the jump wire 40c and the upper surface of the cover body portion 65. According to the present example embodiment, when the jump wires 40c are bundled by the binding band 7, one end of the binding band 7 can be caused to easily pass through the gap between the jump wire 40c and the upper surface of the cover body portion 65, and the workability of a binding step can be enhanced.

The plurality of ribs 68 and 69 have first ribs 68 and second ribs 69 alternately arranged along the circumferential direction. As viewed from the radial direction, the first rib 68 and the second rib 69 are arranged side by side in the circumferential direction with a predetermined gap therebetween. As viewed with the upper end surfaces of the first rib 68 and the second rib 69 as a reference, a recessed groove 63 extending along the radial direction is provided between the first rib 68 and the second rib 69. That is, the recessed groove 63 is provided on the upper surface (surface facing one side in the axial direction) of the cover body portion 65.

The recessed groove 63 is recessed downward. The recessed groove 63 is provided over the entire width of the cover body portion 65 in the radial direction. Thus, the recessed groove is opened to the inside and the outside of the cover body portion 65 in the radial direction. A position of the recessed groove 63 in the circumferential direction coincides with positions of the upper cutout portion 57 and the lower cutout portion 58 of the outer wall portion 53 in the circumferential direction. Thus, a position of the binding band 7 in the circumferential direction wound around the upper cutout portion 57 and the lower cutout portion 58 coincides with a position of the recessed groove 63 in the circumferential direction.

According to the present example embodiment, when the jump wires 40c are bundled by the binding band 7, the binding band 7 can be disposed on the lower side of the jump wire 40c by causing the one end portion of the binding band 7 to pass through the recessed groove 63, and thus, the workability of the binding step can be enhanced. An operation of binding the jump wires 40c with the binding band 7 may be performed by using an assembling device or the like. In this case, the binding step of the binding band 7 can be stably performed by causing one end portion of the binding band 7 to pass through the recessed groove 63 by a nozzle of the assembling device.

In the present example embodiment, although a case where a valley portion between the first rib 68 and the second rib 69 functions as the recessed groove 63 has been described, even though the recessed groove 63 is directly provided on a flat surface, the above-described effect obtained by providing the recessed groove 63 can be obtained.

As illustrated in FIG. 3, the plurality of fixing pieces 64 of the cover 60 protrude outward from the outer edge 65a of the cover body portion 65. The plurality of fixing pieces 64 are arranged at equal intervals along the circumferential direction. The fixing piece 64 has a plate shape of which a thickness direction is the axial direction. The same number (that is, 12) of fixing pieces 64 as the number of insulators 50 are provided in the cover 60 according to the present example embodiment. The fixing pieces 64 are arranged inside the cutout portion 53c provided in the outer wall portion 53 of the insulator 50.

Figure 6:
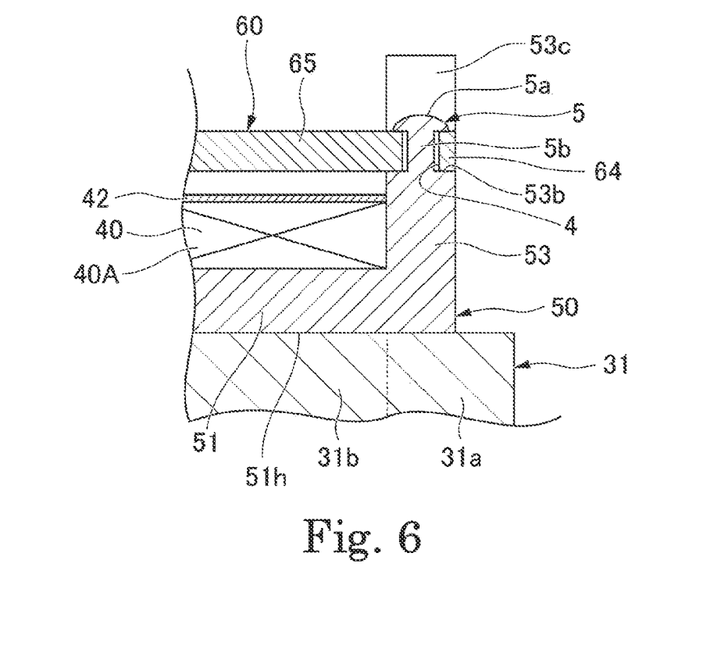
FIG. 6 is a partial cross-sectional view of a stator according to an example embodiment of the present disclosure.

FIG. 6 is a partial cross-sectional view of the stator 30 passing through the fixing piece 64.

A lower surface of the fixing piece 64 is in contact with the bottom surface 53b of the cutout portion 53c of the insulator 50. A fixing hole 4 penetrating in the thickness direction is provided in the fixing piece 64. The boss 5 provided in the insulator 50 is inserted into the fixing hole 4.

The boss 5 includes a columnar portion 5b having a columnar shape and a release prevention portion 5a positioned at a distal end of the columnar portion 5b. That is, the release prevention portion 5a is provided at a distal end of the boss 5. An outer diameter of the columnar portion 5b is smaller than an inner diameter of the fixing hole 4. The columnar portion 5b of the boss 5 passes through the fixing hole 4. The release prevention portion 5a is formed in a substantially circular shape as viewed from the axial direction by thermally caulking the distal end of the boss 5. An outer diameter of the release prevention portion 5a is larger than an inner diameter of the fixing hole 4. The release prevention portion 5a is in contact with an upper surface of the fixing piece 64. Accordingly, the cover 60 is fixed to the insulator 50. The release prevention portion 5a may not have a circular shape as viewed from the axial direction. That is, at least a part of an outer edge of the release prevention portion 5a may be larger than the inner diameter of the fixing hole 4 as viewed from the axial direction.

According to the present example embodiment, since the cover 60 is fixed to the insulator 50, it is possible to suppress the cover 60 from being separated upward from the plurality of insulators 50. Thus, the movement of the insulator 50 by the cover 60 is more stably suppressed, and the reliability of the stator 30 can be enhanced.

In the present example embodiment, a structure in which the release prevention portion 5a is provided at the distal end of the boss 5 has been described. However, the boss 5 and the fixing hole 4 may be fixed without providing the release prevention portion 5a by setting the outer diameter of the columnar portion 5b and the inner diameter of the fixing hole 4 to have fitting dimensions.

In the present example embodiment, the bosses 5 are provided in all the insulators 50, and all the bosses 5 are inserted into the fixing holes 4 of the cover 60. Accordingly, the fixing of the cover 60 is stabilized. However, when the cover 60 is fixed to at least one insulator 50, the movement of the cover upward is suppressed, and the separation thereof from the plurality of insulators 50 is suppressed. Thus, in the present example embodiment, the cover 60 may be fixed to at least one insulator 50.

The cover 60 according to the present example embodiment supports the inner surface 53a of the insulator 50 at the opposing surface 65f facing the outside in the radial direction. That is, an object of the present example embodiment is to suppress the movement of the insulator 50 inward in the radial direction. On the other hand, the cover 60 and the insulator 50 including the boss 5 and the fixing hole 4 are fixed, and thus, the separation of the cover 60 upward is suppressed. That is, the fixing using the boss 5 and the fixing hole 4 according to the present example embodiment is not intended to restrict the movement of the insulator 50 inward in the radial direction.

However, even though the cover 60 is not in contact with the inner surface 53a of the insulator 50, when the plurality of insulators 50 are fixed to the cover 60, a change in a relative positional relationship between the plurality of fixed insulators 50 is restricted, and the separation of the insulator 50 from the tooth portion 31b is suppressed. As a result, the insulator 50 can be stably fixed to the stator core 31.

Next, an assembly procedure of the stator 30 will be described with reference to FIG. 2.

First, the coil wire 41 is wound around the first insulator 50A to form the first coil 40A. The coil wire 41 is wound around the second insulator 50B to form the second coil 40B.

The covering portion 42 is provided on the outer peripheral surface of the first coil 40A. The covering portion 42 according to the present example embodiment is a heat shrinkable tube. Thus, first, the covering portion 42 before contraction is covered on the outer peripheral surface of the first coil 40A, and the covering portion 42 is shrunk by applying heat.

Subsequently, the six second insulators 50B are attached to the tooth portions 31b from the inside in the radial direction. At this time, the six second insulators 50B are attached to the six tooth portions 31b that are skipped one by one in the circumferential direction among the 12 tooth portions 31b.

Subsequently, the first insulator 50A is attached to the remaining tooth portions 31b from the inside in the radial direction. Accordingly, the first coils 40A and the second coils 40B are alternately arranged in the circumferential direction.

Subsequently, the cover 60 is attached to the insulator 50 from below. At this time, the boss 5 of the insulator 50 is inserted into the fixing hole 4 of the insulator 50, and the boss 5 is thermally caulked to form the release prevention portion 5a at the distal end of the boss 5 (see FIG. 6). Accordingly, the lower cover 60 is fixed to the insulator 50.

Subsequently, the insulating sheet 3 is inserted between the inner peripheral surface of the core back portion 31a and the outer wall portion 53 of the insulator 50 from above. The cover 60 is attached to the insulator 50 from above. At this time, the boss 5 of the insulator 50 is inserted into the fixing hole 4 of the insulator 50, and the boss 5 is thermally caulked to form the release prevention portion 5a at the distal end of the boss 5 (see FIG. 6). Accordingly, the upper cover 60 is fixed to the insulator 50.

According to the present example embodiment, the insulator 50 can be fixed to the stator core 31 without using an adhesive. Thus, it is possible to suppress variations in adhesive strength due to variations in the application amount of the adhesive, and a decrease in adhesive strength due to deterioration of the adhesive. During manufacturing, a time required for curing the adhesive can be shortened as compared with a case where the adhesive is used, and the manufacturing cost can be reduced.

Figure 7:
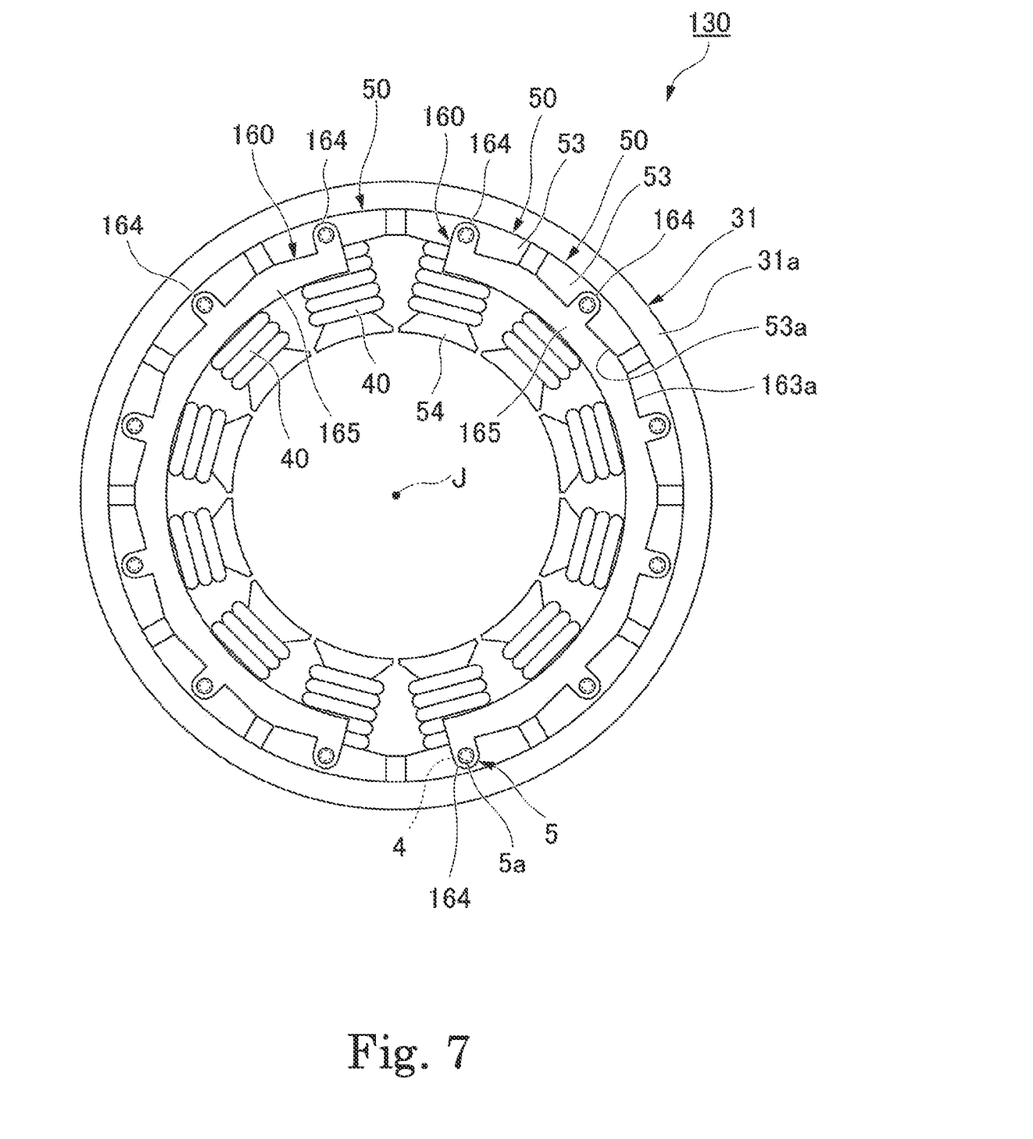
FIG. 7 is a plan view schematically illustrating a stator according to a first modification example embodiment of the present disclosure.

FIG. 7 is a plan view schematically illustrating a stator 130 according to a first modification example which can be employed in the motor 10 according to the above-described example embodiment. The stator 130 according to the present modification example is mainly different in a configuration of a cover 160. In FIG. 7, the jump wire 40*c* positioned on an upper side of the cover 160 is not illustrated.

A constituent element of the identical aspect to that of the above-described example embodiment is denoted by the same reference sign, and is omitted from description.

The stator 130 according to the present modification example includes two (four in total) covers 160 on each of the upper side and the lower side of the plurality of insulators 50. Here, the two cover 160 arranged on the upper side among the four covers 160 will be described, but the two covers 160 arranged on the lower side also have the same configuration.

One of the two covers 160 arranged on the upper side of the insulator 50 is disposed immediately above the six coils 40 arranged in the circumferential direction among the 12 coils 40, and the other cover is disposed immediately above the remaining six coils 40. The two covers 160 have the same shape.

The cover 160 includes a cover body portion 165 and a plurality of (six in the present modification example) fixing pieces 164. The cover body portion 165 has an arc shape extending along the circumferential direction with the central axis J as a center. The cover body portion 165 extends in the circumferential direction through between the outer wall portion 53 and the inner wall portion 54. One cover body portion 165 is in contact with the inner surfaces 53*a* of the six insulators 50 from the inside in the radial direction. Accordingly, the cover 160 supports the inner surface 53*a* from the inside in the radial direction, and suppresses the movement of the insulator 50 to the inside in the radial direction.

As in the above-described example embodiment, the cover body portion 165 may have a protrusion rib on an opposing surface facing the outside in the radial direction, and may be in contact with the inner surface 53*a* at a distal end of the protrusion rib.

Each of the six fixing pieces 164 protrudes to the outside in the radial direction from an outer edge 163*a* of the cover body portion 165. The plurality of fixing pieces 164 are arranged at equal intervals along the circumferential direction. The fixing piece 164 has a plate shape of which a thickness direction is the axial direction. A fixing hole 4 penetrating in the thickness direction is provided in the fixing piece 164. The boss 5 provided in the insulator 50 is inserted into the fixing hole 4. The release prevention portion 5*a* is provided at the distal end of the boss 5. Accordingly, the fixing piece 164 is fixed to the insulator 50. The six fixing pieces 164 are fixed to different insulators 50. Accordingly, the cover 160 fixes the six insulators 50 to each other.

According to the cover 160 according to the present modification example, as in the above-described example embodiment, the inner surface 53*a* is supported from the inside in the radial direction, and the movement of the insulator 50 to the inside in the radial direction is suppressed. Accordingly, the interference between the insulator 50 and the rotor 20 can be suppressed, and the reliability of the motor 10 can be enhanced.

Figure 8:
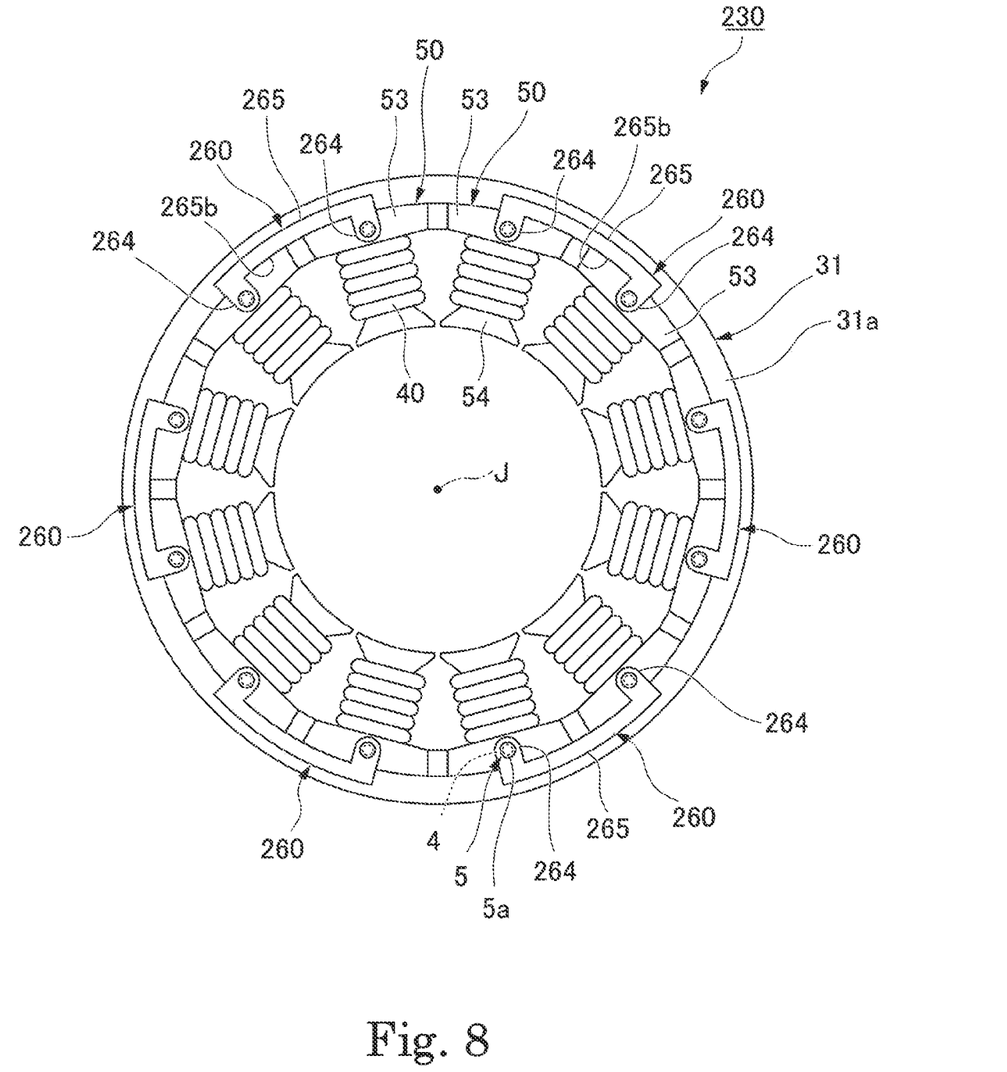
FIG. 8 is a plan view schematically illustrating a stator according to a second modification example embodiment of the present disclosure.

FIG. 8 is a plan view schematically illustrating a stator 230 according to a second modification example which can be employed in the motor 10 according to the above-described example embodiment. The stator 230 according to the present modification example is mainly different in a configuration of a cover 260. In FIG. 8, the jump wire 40*c* positioned on an upper side of the cover 260 is not illustrated.

A constituent element of the identical aspect to that of the above-described example embodiment is denoted by the same reference sign, and is omitted from description.

The stator 230 according to the present modification example includes six (12 in total) covers 260 on each of the upper side and the lower side of the plurality of insulators 50. Although the six covers 260 arranged on the upper side among the 12 covers 260 will be described here, the six covers 260 arranged on the lower side also have the same configuration. All the covers 260 have the same shape.

One cover 260 is disposed across the pair of insulators 50 adjacent to each other in the circumferential direction. The cover 260 includes a cover body portion 265 and a plurality of fixing pieces 264. The cover body portion 265 has an arc shape extending along the circumferential direction with the central axis J as a center. The cover body portion 265 is positioned on the outside of the outer wall portion 53 in the radial direction. The cover body portion 265 extends along the circumferential direction along a surface of the outer wall portion 53 facing the outside in the radial direction. The cover body portion 265 overlaps the core back portion 31*a* as viewed from the axial direction.

The cover 260 has two fixing pieces 264. Each of the fixing pieces 264 protrudes to the inside in the radial direction from an inner edge 265*b* of the cover body portion 265. The fixing piece 264 has a plate shape of which a thickness direction is the axial direction. A fixing hole 4 penetrating in the thickness direction is provided in the fixing piece 264. The boss 5 provided in the insulator 50 is inserted into the fixing hole 4. The release prevention portion 5*a* is provided at the distal end of the boss 5. Accordingly, the fixing piece 264 is fixed to the insulator 50. The two fixing pieces 264 are fixed to different insulators 50.

The cover 260 according to the present modification example fixes the two insulators 50 to each other. Accordingly, a relative positional relationship between the two insulators 50 is fixed. As a result, the cover body portion 265 can suppress the releasing of the insulator 50 from the tooth portion 31*b*, suppress the interference between the insulator 50 and the rotor 20, and enhance the reliability of the motor 10.

Figure 9:
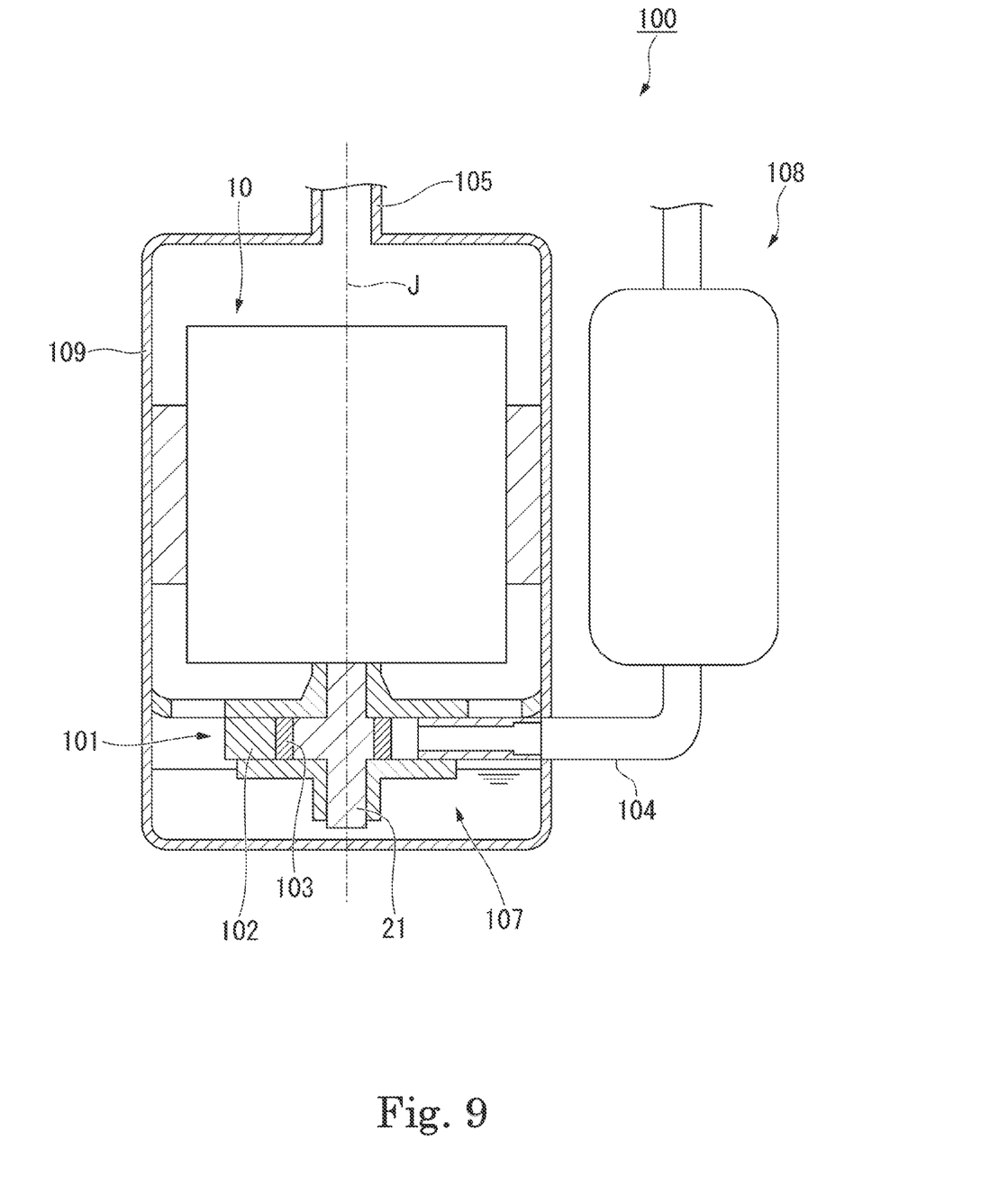
FIG. 9 is a schematic view of a compressor on which a motor according to an example embodiment of the present disclosure is provided.

FIG. 9 is a schematic diagram of a compressor 100 in which the motor 10 according to the example embodiment is provided. The compressor 100 according to the present example embodiment includes the motor 10, a compression mechanism unit 101 positioned on a lower side of the motor 10, a case 109, and an accumulator 108.

The compression mechanism unit 101 includes an eccentric rotor 103 and a cylinder 102 surrounding the eccentric rotor 103. The eccentric rotor 103 is connected to the shaft 21 of the motor 10 and rotates as the motor 10 is driven.

The case 109 accommodates the motor 10 and the compression mechanism unit 101. A suction pipe 104 and a discharge pipe 105 are connected to the case 109. Lubricating oil is supplied to a lubricating oil reservoir 107 inside the case 109 to facilitate an operation of the compression mechanism unit 101.

The accumulator 108 stores the refrigerant and the lubricating oil in a separated state. The separated refrigerant in the accumulator 108 is supplied to the compression mechanism unit 101 inside the case 109 via the suction pipe 104.

The compressor 100 rotates the eccentric rotor 103 of the compression mechanism unit 101 as the motor 10 is driven. Accordingly, the compressor 100 sucks the refrigerant from the suction pipe 104 into the cylinder 102 and compresses the refrigerant in the compression mechanism unit 101. The compressed refrigerant passes around and inside the motor 10 and is discharged from the discharge pipe 105 provided at an upper portion of the case 109.

Although the example embodiments and modification examples of the present disclosure have been described above, the configurations and the combinations of the elements described in the example embodiments and modification examples are merely examples, and therefore addition, omission, substation and other modifications may be made appropriately within the scope of the present disclosure. Also note that the present disclosure is not limited by the example embodiment.

For example, in the above-described example embodiment, the motor mounted on the compressor has been described, but the same configuration may be adopted in the motor mounted on the water pump or the oil pump.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator comprising:
a stator core that includes a core back portion having an annular shape and with a central axis as a center, and tooth portions extending from the core back portion to an inside in a radial direction and arranged in a circumferential direction;
insulators that are attached to the tooth portions from the inside in the radial direction;
a coil that is wound around the insulator; and
a cover that supports an inner surface of the insulator opposing the inside in the radial direction from the inside in the radial direction; wherein
the cover includes an opposing surface opposing an outside in a radial direction and opposing the inner surface of the insulator; and
protrusions that are arranged along the circumferential direction, protrude to the outside in the radial direction, and are in contact with the inner surface, are provided on the opposing surface at distal ends.

2. The stator according to claim 1, wherein
the insulator includes wall portions that extend along the circumferential direction and at which the inner surface is provided; and
the cover has an annular shape fitted to the inside of the wall portions.

3. The stator according to claim 1, wherein
the cover is fixed to the insulator.

4. The stator according to claim 3, wherein
the insulator includes a boss protruding toward the cover; and
a fixing hole into which the boss is inserted is provided in the cover.

5. The stator according to claim 4, wherein
a release prevention portion larger than an inner diameter of the fixing hole is provided at a distal end of the boss.

6. The stator according to claim 1, wherein
the inner surface of the insulator is in contact with one of the protrusions positioned on one side in the circumferential direction and another one of the protrusions positioned on another side from a center line of the tooth portion as viewed from an axial direction.

7. The stator according to claim 1, wherein
the cover includes a cover body portion positioned on one side of the coil in an axial direction;
a recess portion recessed to the inside in the radial direction is provided at an outer edge positioned on an outside of the cover body portion in the radial direction; and
a coil wire extending from the coil passes through the recess portion.

8. The stator according to claim 1, further comprising:
insulating sheets arranged along a surface of the core back portion opposing the inside in the radial direction; wherein
the cover includes a cover body portion positioned on one side of the coil in an axial direction; and
an accommodation recess portion in which an end portion of the insulating sheet on one side in the axial direction is accommodated is provided on a surface of the cover body portion opposing another side in the axial direction.

9. The stator according to claim 1, wherein
a plurality of the coils are connected to each other by a jump wire extending along the circumferential direction on one side of the coil in an axial direction;
a plurality of the jump wires are bound together by a binding band;
the cover includes a cover body portion positioned on one side of the coil in the axial direction and on another side of the jump wire in the axial direction; and
a rib that protrudes toward one side in the axial direction and extends along the radial direction is provided on a surface of the cover body portion on the one side in the axial direction.

10. The stator according to claim 1, further comprising:
two covers; wherein
one cover of the two covers supports the inner surface on one side of the insulator in an axial direction; and
another one cover of the two covers supports the inner surface on another side of the insulator in the axial direction.

11. A motor comprising:
the stator according to claim 1;
a rotor that opposes the stator in a radial direction; and
a housing that accommodates the stator and the rotor.

12. The motor according to claim 11, wherein
a refrigerant flows from one side of the stator to another side of the stator in an axial direction in the housing; and
the refrigerant passes through a slot between the tooth portions.

13. A stator comprising:
a stator core that includes a core back portion having an annular shape and with a central axis as a center, and tooth portions extending from the core back portion to an inside in a radial direction and arranged in a circumferential direction;
insulators that are attached to the tooth portions from the inside in the radial direction;
a coil that is wound around the insulator; and
a cover that supports an inner surface of the insulator opposing the inside in the radial direction from the inside in the radial direction; wherein
the insulator includes a pair of arm portions extending to two sides in the circumferential direction; and inner peripheral surfaces of the pair of arm portions are in contact with outer peripheral surfaces of the insulators adjacent to each other in the circumferential direction opposing an outside in the radial direction.

14. A stator comprising:
a stator core that includes a core back portion having an annular shape and with a central axis as a center, and tooth portions extending from the core back portion to an inside in a radial direction and arranged in a circumferential direction;
insulators that are attached to the tooth portions from the inside in the radial direction;
a coil that is wound around the insulator; and
a cover that supports an inner surface of the insulator opposing the inside in the radial direction from the inside in the radial direction; wherein
the coils are connected to each other by a jump wire extending along the circumferential direction on one side of the coil in an axial direction;
a plurality of the jump wires are bound by a binding band,
the cover includes a cover body portion positioned on one side of the coil in the axial direction and on another side of the jump wire in the axial direction;
a recessed groove extending along the radial direction is provided in a surface of the cover body portion on one side in the axial direction; and
a position of the binding band in the circumferential direction coincides with a position of the recessed groove in the circumferential direction.

15. A stator comprising:
a stator core that includes a core back portion having an annular shape and with a central axis as a center, and tooth portions extending from the core back portion to an inside in a radial direction and arranged in a circumferential direction;
insulators that are attached to the tooth portions from the inside in the radial direction;
a coil that is wound around the insulator;
a cover that supports an inner surface of the insulator opposing the inside in the radial direction from the inside in the radial direction; and
insulating sheets arranged along a surface of the core back portion opposing the inside in the radial direction; wherein
the cover includes a cover body portion positioned on one side of the coil in an axial direction; and
an accommodation recess portion in which an end portion of the insulating sheet on one side in the axial direction is accommodated is provided on a surface of the cover body portion opposing another side in the axial direction.

16. A stator comprising:
a stator core that includes a core back portion having an annular shape and with a central axis as a center, and tooth portions extending from the core back portion to an inside in a radial direction and arranged in a circumferential direction;
insulators that are attached to the tooth portions from the inside in the radial direction;
a coil that is wound around the insulator; and
a cover that supports an inner surface of the insulator opposing the inside in the radial direction from the inside in the radial direction; wherein
a plurality of the coils are connected to each other by a jump wire extending along the circumferential direction on one side of the coil in an axial direction;
a plurality of the jump wires are bound together by a binding band;
the cover includes a cover body portion positioned on one side of the coil in the axial direction and on another side of the jump wire in the axial direction; and
a rib that protrudes toward one side in the axial direction and extends along the radial direction is provided on a surface of the cover body portion on the one side in the axial direction.

* * * * *